United States Patent Office 3,703,434
Patented Nov. 21, 1972

3,703,434
HEAT-ACTIVATABLE ADHESIVE SHEETS
Ronald L. Schaaf, St. Paul, Minn., assignor to Minnesota
Mining and Manufacturing Company, St. Paul, Minn.
No Drawing. Filed Mar. 29, 1968, Ser. No. 717,377
Int. Cl. B32b 27/38, 27/34, 15/08
U.S. Cl. 161—167                                    12 Claims

ABSTRACT OF THE DISCLOSURE

A self-supporting heat-activatable adhesive sheet comprising a film of thermoplastic polyamide resin coated on both sides with a relatively thin layer of a substantially uniform blend of fusible epoxy resin and amine. The adhesive sheet has excellent shelf life at temperatures up to about 120° F. while being capable of rapidly forming strong heat-resistant compositions on both surfaces of said adhesive sheet when subjected to heat and pressure.

BACKGROUND OF THE INVENTION

This invention relates to adhesive sheets; more particularly, it relates to self-supporting heat-activatable polyamide adhesive sheets.

There has long been a need, particularly in the metal can making industry, for a fast acting metal bonding adhesive for side seams, end seams, etc. in rigid wall containers, as well as for hermetically sealing preformed fill openings. A truly satisfactory adhesive for such purposes should have excellent adhesion to metal, be rapidly bondable for high speed production use, be bondable at temperatures below the melting point of metal surfaces such as tinplate and aluminum, have good shelf life under nonrefrigerated warehousing conditions, be resistant to processing temperatures up to about 260° F., and be adapted for use with mechanized bonding machinery.

A particularly acute commercial need for such an adhesive having the foregoing characteristics is as an adhesive for bonding a thin metal patch to cans such as contain condensed milk, the metal patch serving to seal the opening through which the milk is introduced to the can. At present, a drop of solder has performed this sealing function, but its use is undesirable for a number of reasons. For example, to prevent the molten solder drop from falling through the fill opening into the condensed milk, the fill opening must be ⅛ inch or less in diameter, thereby limiting the rate of filling to approximately 150 cans per minute. Insofar as is known, however, no adhesive is available which can rapidly bond a metal patch to the can and still withstand the 260° F. autoclave processing to which the sealed container and contents are subsequently exposed.

Adhesive sheets of polyamide resin film coated on both sides with an epoxy resin as disclosed in U.S. Pat. 2,962,468 are known to adhere well to various surfaces including metal; however, the temperatures needed to adequately bond such adhesives are generally above the melting point of the tinplate coating on most metal containers. When the temperature used to make the bond is reduced, the time required becomes excessively long. Although rubbers, pigments, catalysts, etc. have been added to the epoxy resin in an attempt to modify the properties of these adhesive sheets, their addition has not produced room temperature storable, self-supporting adhesive sheets that will quickly produce strong adhesive bonds to metal at relatively low bonding temperatures.

SUMMARY

This invention provides a self-supporting heat-activatable adhesive sheet comprising a self-supporting substantially uniform cross-sectioned thermoplastic polyamide resin film coated on both sides with a relatively thin layer of a substantially uniform blend of fusible epoxy resin and amine.

The self-supporting heat-activatable adhesive sheet of this invention has excellent adhesion to metal surfaces such as tinplate, aluminum, iron and steel, is bondable at temperatures below the melting point of tinplate, has excellent shelf life at temperatures below 120° F., is resistant to processing temperatures up to about 260° F., and is readily adapted for use with mechanized bonding machinery. Additionally, the adhesive sheet has outstanding tensile and cohesive strength.

Adhesive sheets made in accordance with the invention are admirably suited to adhering a thin metal patch over the fill opening of a condensed milk can. Adhesion can be so tenacious that it is almost impossible to manually peel off a metal patch bonded in such a manner. Alternatively, the metal patch can be bonded in a manner so as to be manually peelable from the can surface to provide easy and convenient opening of the fill opening to dispense the can contents. In both instances, the adhesive sheets resist the subsequent 260° F. autoclave processing temperature and resultant internal container pressure. Metal patch material backed with the adhesive sheets of this invention provides an adhesive tape-type structure which constitutes a particularly convenient form of providing metal patches for can fill openings.

Adhesive sheets or tapes prepared in accordance with this invention are also ideally suited for bonding various substrates in numerous other applications, such as the aluminum-aluminum overlap shear bonds typically found in the aircraft industry. Strong adhesive bonds are easily and rapidly made which typically give shear values of 5,000 p.s.i. when tested according to ASTM D1002-64.

The epoxy resin included in the fusible coating applied to the polyamide resin film has an average of at least one glycidyl ether group per molecule and an epoxide equivalent below about 6,000, preferably below about 4,000. The amine blended therewith has at least one active hydrogen atom per molecule which is a substituent of an amino nitrogen atom. In the case of a compound having two ro more active hydrogen atoms such atoms may be attached to the same or a different amino nitrogen atom. When subjected to heat and pressure, the polyamide film and components thereon melt and flow together to form an adhesive composition.

As noted previously, polyamide resin films coated on both sides with epoxy resin are known in the art. However, blending an amine with the epoxy resin in accordance with the present invention before applying it to the polyamide resin film produces an adhesive sheet that gives a higher adhesive strength at a given bonding temperature than the prior art combination of polyamide film and epoxy resin alone. Inclusion of the amine permits bonding at temperatures below the bonding temperatures of the prior art adhesives while maintaining satisfactory adhesive bond strength. Even more surprising is the fact that the combination of epoxy resin and amine is stable at temperatures below 120° F. and does not result in a stiff brittle hardened composition as would normally be expected. In general, a shelf-life of about six months at an ambient temperature of 120° F. is obtained, contrary to results obtained with one part of premixed epoxy-amine combinations where a polyamide film is absent.

The times, temperatures, and pressures necessary for satisfactory bonding of the adhesive sheets can vary considerably. For example, at 250° F., about 20 minutes is required to produce a satisfactory adhesive bond, while at 435° F., 10 seconds is adequate. At 500° F., the time necessary to produce a bond is as short as one second. The pressure used when making a bond need only be sufficient to cause the adhesive to flow slightly at the particular bonding temperature used.

The following polyamide resin films are particularly well suited for use in our adhesive sheets: polyhexamethylene adipamide, polyhexamethylene sebacamide, polycaprolactam, poly-12-amino-dodecanoic acid, poly-11-amino-undecanoic acid, as well as other polyamides and interpolyamides of the type mentioned in U.S. Pats. 2,071,253, 2,130,523, and 2,130,948. The polyamide resin film can vary considerably in thickness, ranging from about 0.25 mil to about 20 mils, although, for flexibility and ease of handling, films from about 1 mil to about 10 mils thick are preferred. The polyamide resin film can also be a woven or nonwoven fibrous fabric made from filaments of polyamide resin.

The epoxy resins employed in the present invention have an average of at least one glycidyl ether group per molecule. Preferred are polymeric epoxy-hydroxy ethers, having at least one terminal glycidyl ether group per molecule, resulting from the catalyzed reaction of a polyhydric alcohol (e.g., a glycol, glycerine, trimethylol propane, a polyhydric phenol, or a polyphenol) with an excess of an epoxide (e.g., an epihalohydrin or alkylene oxide, as described in U.S. Pats. 2,456,408 and 2,592,-560). Other equally useful epoxy resins are the resinous phenol-formaldehyde novolak glycidyl ethers, having an epoxide equivalent weight of below about 500, typically prepared by reacting a phenol-formaldehyde novolak resin with epichlorohydrin as described in British Pat. 746,824.

The amine utilized in the coating for the polyamide resin film has at least one active hydrogen atom per molecule as determined by the Zerwitinoff test, the active hydrogen being bonded to an amino nitrogen atom. Additionally, the amine must be such as will not volatilize from the adhesive sheet during bonding. Preferred amines are: diethylene triamine, triethylene tetramine, and partially reacted adducts of polyfunctional amines with epoxy resin. The amine and epoxy resin for the polyamide film coating are combined in an equivalents ratio of epoxide to active hydrogen of from about 1:0.25 to about 1:3, preferably from about 1:0.25 to about 1:0.75. Increasing the amount of amine above this ratio substantially decreases the shelf life of the adhesive sheet, while use of an amount of amine below this ratio fails to produce the desired rapid heat-activation and increased bond strength.

The total amount of epoxy-amine fusible coating applied to the polyamide resin film surfaces ranges from about 0.01 to about 0.50, preferably from about 0.025 to about 0.10 gram per square foot of polyamide film.

The adhesive sheets of this invention can be prepared in several ways. Preferably, solvent solutions of epoxy resin and amine are first prepared, then the two mixed in proper proportion, the mixture applied to the major surfaces of a preformed polyamide film by standard coating techniques, and then solvent removed. The adhesive sheet is then placed between the surfaces to be bonded and heated under pressure in a platen press or electrical impulse heater.

A method of effectively making tapes from our adhesive sheets is to apply the premixed epoxy-amine solution to a thin metal backing, evaporate the solvent, extrude a melted film of polyamide resin on the coated metal backing and immediately cool the laminate. Premixed epoxy-amine solution is thereafter applied to the exposed noncoated surface of the extruded polyamide resin, and the solvent evaporated to provide a heat-activatable adhesive tape.

An alternate method to prepare an adhesive coated thin metal patch for sealing the fill opening of a condensed milk can and the like, is as follows: premixed epoxy-amine solution is coated on one surface of the polyamide resin film and solvent removed, after which the film is laminated to one side of a metal backing such as aluminum by means of heat and pressure. The uncoated side of the film is then coated with premixed epoxy-amine solution and solvent removed. The resultant metal backed adhesive sheet may then be used to seal condensed milk cans or adhered to other surfaces by means of heat and pressure.

The following examples, in which all parts are by weight unless otherwise noted, illustrate preparation of the adhesive sheets and tapes of our invention, without limiting the scope of the invention.

DESCRIPTION OF PRESENTLY PREFERRED EMBODIMENTS

Example 1

This example illustrates the use of poly-11-amino-undecanoic acid self-supporting film coated with a mixture of a liquid amine and a bisphenol-A/epichlorohydrin epoxy resin which is a solid at 65° F. A solid bisphenol-A/epichlorohydrin epoxy resin, having an equivalent weight from about 350 to about 800, and a melting point of about 125° F. (obtained from Union Carbide Corporation as "EKR–2002") is dissolved in methyl ethyl ketone at a concentration of 10%. An amine having an equivalent weight of about 50 and a viscosity of 5,000–13,000 centipoises and which is the reaction product of diethylene triamine and a liquid bisphenol-A/epichlorohydrin epoxy resin (obtained from Union Carbide Corporation as "ERL–2793") is also dissolved in methyl ethyl ketone at a concentration of 40%.

The epoxy solution and the amine solution are mixed in a ratio of 60 parts of epoxy solution to one part of amine solution. (This ratio is about one-half the stoichiometric amount of amine normally used to cure this epoxy resin or an epoxy:amine equivalent ratio of 1:0.5.) The initially cloudy solution cleared after several minutes of stirring and is allowed to stand for 24 hours before use.

The premixed epoxy-amine solution is applied to one side of a three mil film of poly-11-amino-undecanoic acid (Rilsan film, obtained from Organico, SPA, Paris, France) by means of a wire wound coating bar (#8 R.D.S. Specialty Coating Rod) and dried for ten seconds at 260° F. The other side of the polyamide film is then coated and dried in the same manner. The resulting adhesive sheet is placed between two panels of 20 mil 3003–H19 aluminum previously cleaned by immersion in 8% trisodium phosphate solution at 180° F. for 30 seconds, then in concentrated nitric acid for 15 seconds, rinsed, and dried.

The aluminum-adhesive sheet-aluminum sandwich is placed in a platen press maintained at 435° F., allowed to preheat for 15 seconds, and bonded for ten seconds at a pressure of 100 p.s.i. The bonded laminate is immediately removed from the press, quenched, and cut into ¾ inch wide test specimens.

One set of adjacent ends of each test specimen are placed in the jaws of an Instron Tensile testing machine and pulled apart at an angle of 180° so as to form a T configuration. The rate of jaw separation is twenty inches per minute. The adhesive peel bond strength obtained ranges from about 23 lbs. to about 37 lbs. per ¾ inch width. Adhesive peel bonds made with an adhesive sheet aged for six months at 120° F. have a peel bond strength about 15% less than that obtained with a fresh adhesive sheet.

An adhesive sheet which does not contain amine is prepared and tested in the same manner. The adhesive peel strength obtained ranges from about 5 lbs. to about 8.3 lbs. per ¾ inch width.

EXAMPLES 2–19

Example 1 is repeated using various polyamide resin films, epoxy resins, and amines. Where amines are used, the epoxy:amine equivalent ratio is 1:0.5. The adhesive peel bond strengths obtained are shown in Table I along with the deviations in procedure from Example I.

TABLE I

| Example | Polyamide resin film | Amine | Amine equivalent weight | Epoxide equivalent weight | Bonding temp., °F. | Bonding time, seconds | Peel bond strength, lbs. per ¾ inch width Without amine | Peel bond strength, lbs. per ¾ inch width With amine |
|---|---|---|---|---|---|---|---|---|
| 1 | Poly-11-amino-undecanoic acid (3 mil) | Adduct of DETA and bisphenol-A epichlorohydrin epoxy resin. | 50 | 350–800 | 435 | 10 | 5–8.3 | 23–37 |
| 2 | Poly-12-amino-dodecanoic acid [1] (1 mil) | do | 50 | 350–800 | 435 | 10 | 3–12 | 10–26 |
| 3 | Interpolyamide [2] (10 mil) | do | 50 | 350–800 | 435 | 10 | 32–58 | 40–90 |
| 4 | Polycaprolactam [3] (1 mil) | do | 50 | 350–800 | 500 | 10 | 4–10 | 12–27 |
| 5 | Polyhexamethylene sebacamide [4] (3 mil) | do | 50 | 350–800 | 500 | 10 | 2–9 | 20–40 |
| 6 | Poly-11-amino-undecanoic acid (1 mil) | do | 50 | [5] 200–220 | 500 | 15 | 8–20 | 21–45 |
| 7 | do | do | 50 | [5] 230–280 | 500 | 15 | 40–60 | 66–83 |
| 8 | do | do | 50 | [5] 280–350 | 500 | 15 | 30–42 | 61–85 |
| 9 | do | do | 50 | [5] 875–1,025 | 500 | 15 | 33–52 | 50–58 |
| 10 | do | do | 50 | [5] 2,000–2,500 | 500 | 15 | 23–47 | 51–68 |
| 11 | do | do | 50 | [5] 2,500–4,000 | 500 | 15 | 16–52 | 33–66 |
| 12 | do | do | 50 | [6] 280–350 | 435 | 1 | 2.3–7.0 | 12–46 |
| 13 | do | do | 50 | [6] 550–700 | 435 | 1 | 2.1–5.3 | 14–27 |
| 14 | do | do | 50 | [7] 170–180 | 435 | 1 | 0.8–2.6 | 12–20 |
| 15 | do | do | 50 | [7] 170–180 | 500 | 10 | 16–30 | 33–63 |
| 16 | do | Diethylene triamine | 20 | 350–800 | 435 | 10 | 3–7 | 15–32 |
| 17 | do | Triethylene tetramine | 24 | 350–800 | 435 | 10 | 3–7 | 14–44 |
| 18 | do | O-phenylene diamine | 27 | 350–800 | 435 | 10 | 3–7 | 8–16 |
| 19 | do | Piperazine | 43 | 350–800 | 435 | 10 | 3–4 | 15–26 |

[1] Obtained from Olin Matheson Chemical Co.
[2] Obtained from E. I. DuPont & Co. as Zytel 61.
[3] Obtained from Allied Chemical Co. as Capran-77C.
[4] Obtained from E. I. DuPont & Co. as Zytel 31.
[5] The epoxy resins of Examples 6–11 are respectively, Epon 1031, Epon 834, Epon 836, Epon 1004, Epon 1007, Epon 1009, all available from Shell Chemical Co.
[6] The epoxy resins of Examples 12 and 13 are respectively, Epon 836 and Epon 1002 available from Shell Chemical Co.
[7] Resinous phenol-formaldehyde novolak glycidyl ether obtained from Dow Chemical Co. as DEN 438.

EXAMPLE 20

This example illustrates the preparation of a metal backed tape utilizing the adhesive sheet of Example 1.

Three mil poly-11-amino-undecanoic acid resin film is coated on one side with the epoxy-amine solution of Example 1, and solvent evaporated as in Example 1. A sheet of 5 mil 3003-0 aluminum is heated to 350° F. on a hot plate, the adhesive sheet placed on the aluminum, coated side down, and the assembly laminated by rolling for 30 seconds with a silicone coated steel roller preheated to 250° F.

After cooling, the exposed polyamide surface is coated with the epoxy-amine solution of Example 1 and solvent evaporated. The laminate is then slit into ¾ inch wide strips and wound directly upon itself in overlapping convolutions in a roll for later use. A ⅝ inch diameter circular patch with a ½ inch extension on one edge to serve as a pull tab is cut from the tape to provide an adhesive patch for releasably hermetically sealing the fill opening of a condensed milk can.

The outer surface of the upper wall surrounding the preformed fill opening of a filled condensed milk can is heated to about 425° F. by means of a laboratory heat gun and the adhesive patch lightly placed on the can surface over and surrounding the fill opening. A cylindrical brass weight, preheated to 450° F., is placed on the patch, pressed down with a force of 50 p.s.i., allowed to remain in place for 10 seconds and removed.

After cooling for about 5 minutes, the sealed can is processed in an autoclave for 16 minutes at 212° F. and 10 minutes at 244° F., after which the autoclave is flooded with cold water for about 10 minutes to cool the can. The patch sealed can is satisfactory for containing liquid contents and passes all of the standard abuse tests.

What I claim is:

1. A self-supporting heat-activatable adhesive sheet having excellent shelf life at temperatures below 120° F. while being capable of rapidly forming strong, heat-resistant bonds, said sheet comprising in combination:
a self-supporting thermoplastic polyamide resin film having on opposing major surfaces thereof,
a relatively thin layer, as compared to said film, of a composition comprising a substantially uniform blend of fusible components including
    (a) an epoxy resin having an average of at least one glycidyl ether group per molecule and an epoxide equivalent less than about 6,000, and
    (b) an amine having at least one active hydrogen atom per molecule bonded to an amino nitrogen atom, said fusible components being combined in an equivalent ratio of epoxy to active hydrogen of from about 1:3 to about 1:0.25.

2. The adhesive sheet of claim 1 wherein the polyamide resin is selected from the group consisting of polyhexamethylene adipamide, poly-caprolactam, poly-12-amino-dodecanoic acid, poly-11-amino-undecanoic acid, and polyhexamethylene sebacamide.

3. The adhesive sheet of claim 1 wherein the amine is selected from the group consisting of diethylene triamine, O-phenylene diamine, piperazine, triethylene, tetramine, and adducts of polyfunctional amines with epoxy glycidyl polyethers.

4. The adhesive sheet of claim 1 wherein the epoxy resin is a resinous phenol-formaldehyde novolak glycidyl ether having an epoxide equivalent weight of less than about 500.

5. The adhesive sheet of claim 1 wherein the epoxy resin is a polymeric epoxy-hydroxy ether having at least one terminal glycidyl ether group per molecule, and an epoxide equivalent less than about 4,000.

6. A self-supporting heat-activatable adhesive sheet having excellent shelf life at temperatures below 120° F. while being capable of rapidly forming strong, heat-resistant bonds, said sheet comprising in combination:
a self-supporting thermoplastic polyamide resin film, said polyamide resin being selected from the group consisting of polyhexamethylene adipamide, poly-caprolactam, poly-12-amino-dodecanoic acid, polyhexamethylene sebacamide and poly-11-amino-undecanoic acid, said resin film having on opposing major surfaces thereof
a relatively thin layer, as compared to said film, of a composition comprising a substantially uniform blend of fusible components, including
    (a) an epoxy resin having at least one terminal glycidyl ether group per molecule, and
    (b) an amine selected from the group consisting of diethylene triamine, triethylene tetramine, O-phenylene diamine, piperazine, and adducts of polyfunctional amines with liquid epoxy glycidyl polyethers, said fusible components being combined in an equivalents ratio of epoxy to active hydrogen of from about 1:3 to about 1:0.25.

7. The adhesive sheet of claim 6 wherein the epoxy resin is a solid at 65° F., has an epoxide equivalent weight from about 350 to about 800, and has terminal epoxy glycidyl radicals united through ether oxygen atoms with the divalent residue of a polyhydric alcohol.

8. The adhesive sheet of claim 6 wherein the amine is the adduct resulting from a partial reaction of diethylene triamine with a liquid bisphenol-A/glycidyl polyether, said adduct having an amine equivalent of from about 40 to about 60 and a viscosity of about 3,000 to 15,000 centipoises.

9. The adhesive sheet of claim 6 wherein the polyamide resin film is poly-11-amino-undecanoic acid.

10. A self-supporting heat-activatable adhesive sheet having excellent shelf life at temperatures below 120° F. while being capable of rapidly forming strong, heat-resistant bonds, said sheet comprising in combination:
    a self-supporting substantially uniform cross-sectioned thermoplastic poly-11-amino-undecanoic acid resin film about 0.25 to 20 mils thick, said film having on opposing major surfaces thereof
    a relatively thin tack-free layer, weighing on the order of about 0.01 to 0.5 gram per square foot, of a composition comprising a substantially uniform blend of fusible components including
        (a) an epoxy resin which is solid at 65° F., having terminal epoxy glycidyl radicals united through ether oxygen atoms with the divalent residue of a polyhydric alcohol, an epoxide equivalent weight in the range from about 350 to about 800, and
        (b) an amine which is the adduct resulting from the partial reaction of diethylene triamine with a liquid bisphenol-A/glycidyl ether, said adduct having an amine equivalent of from about 40 to about 60 and a viscosity of from about 3,000 to about 15,000 centipoises, said fusible components being combined in an equivalents ratio of epoxy to active hydrogen of from about 1:3 to about 1:0.25.

11. An article comprising a metal foil having on at least one major surface thereof a securely attached adhesive sheet of claim 1.

12. An article comprising a metal foil having on at least one major surface thereof a securely attached adhesive sheet of claim 10.

References Cited

UNITED STATES PATENTS

| | | | |
|---|---|---|---|
| 2,837,597 | 6/1958 | Delmonte | 260—47 |
| 2,889,397 | 8/1959 | Aelony et al. | 260—18 |
| 2,962,468 | 11/1960 | Groves | 260—42 |
| 2,970,130 | 1/1961 | Finestone | 161—186 |
| 2,986,539 | 5/1961 | Schniepp | 260—18 |
| 3,032,460 | 5/1962 | Chipman et al. | 161—186 X |
| 3,420,794 | 1/1969 | May et al. | 161—186 X |
| 3,475,240 | 10/1969 | Kazuo | 161—186 X |
| 3,484,336 | 12/1969 | Aulik et al. | 161—227 X |
| 3,539,659 | 11/1970 | Hoff | 260—47 EN |

HAROLD ANSHER, Primary Examiner

U.S. Cl. X.R.

117—68, 122 H, 138.8 N, 161 ZB; 161—184, 186, 227